United States Patent
Ueno

(10) Patent No.: US 8,018,798 B2
(45) Date of Patent: Sep. 13, 2011

(54) DEMODULATION CIRCUIT AND OPTICAL DISK DRIVE

(75) Inventor: Keishi Ueno, Iruma (JP)

(73) Assignee: TEAC Corporation, Tama-shi, Tokyo (JP)

( * ) Notice: Subject to any disclaimer, the term of this patent is extended or adjusted under 35 U.S.C. 154(b) by 565 days.

(21) Appl. No.: 12/055,205

(22) Filed: Mar. 25, 2008

(65) Prior Publication Data

US 2008/0239889 A1    Oct. 2, 2008

(30) Foreign Application Priority Data

Mar. 27, 2007  (JP) .................................. 2007-081968

(51) Int. Cl.
*G11B 7/00*   (2006.01)

(52) U.S. Cl. ............. 369/44.13; 369/124.04; 369/53.34; 369/59.16; 369/59.19; 369/59.23

(58) Field of Classification Search ............. 369/124.04, 369/53.34, 59.17, 59.16, 44.13, 59.19, 59.23
See application file for complete search history.

(56) References Cited

U.S. PATENT DOCUMENTS

| | | | |
|---|---|---|---|
| 6,075,761 A * | 6/2000 | Akiyama et al. | 369/47.4 |
| 6,201,773 B1 * | 3/2001 | Aoki | 369/44.13 |
| 6,999,391 B2 * | 2/2006 | Heemskerk et al. | 369/53.34 |
| 2005/0047296 A1 * | 3/2005 | Georgi | 369/47.27 |
| 2007/0172014 A1 * | 7/2007 | Moriwaki et al. | 375/376 |

FOREIGN PATENT DOCUMENTS

JP    2005-216394 A    8/2005

* cited by examiner

*Primary Examiner* — Wayne Young
*Assistant Examiner* — Linh Nguyen
(74) *Attorney, Agent, or Firm* — Seed IP Law Group PLLC

(57) ABSTRACT

A demodulation circuit accurately demodulates a wobble signal of an optical disk without being affected by a phase shift induced by crosstalk. An A-D converter subjects wobble signal reproduced from an optical disk to A-D conversion and feeds a result of conversion to a zero-crossing detection circuit. The zero-crossing detection circuit detects zero-crossing points of the wobble signal. A sinusoidal wave generation circuit generates a sinusoidal wave by means of sequentially connecting sinusoidal wave elements whose periods are each equal to a time interval between zero-crossing points. A multiplier multiplies an original wobble signal by a sinusoidal wave signal. A slicer detects an HMW-modulated portion of the wobble signal, and another slicer detects an MSK-modulated portion of the wobble signal.

9 Claims, 7 Drawing Sheets

DEMODULATION CIRCUIT AND OPTICAL DISK DRIVE

PRIORITY INFORMATION

This application claims priority to Japanese Patent Application No. 2007-081968 filed on Mar. 27, 2007, which is incorporated herein by reference in its entirety.

BACKGROUND

1. Technical Field

The present invention relates to a demodulation circuit and an optical disk drive, and more particularly to reproduction of a wobble signal.

2. Related Art

In an optical disk of record enable type, a recording track is wobbled, and a recording clock signal is generated from the frequency of wobbling. Address information about a disk is embedded in a wobble signal by means of variously modulating wobbles. Consequently, reproduction of the wobble signal is indispensable for effecting recording operation, and the quality of the wobble signal greatly affects recording quality.

In the meantime, as the capacity of a CD, a DVD, a Blu-ray, an HD-DVD, or an optical disk increases, a track pitch becomes smaller in proportion to the diameter of a beam spot focused on the disk. Crosstalk that a wobble signal of a track of interest receives from a wobble signal of an adjacent track tends to increase. Specifically, the phase of the wobble signal of a track being subjected to recording or reproduction is disturbed under the influence of crosstalk from a wobble signal of a track adjacent to an inner radius side or an outer radius side of the track being subjected to recording or reproduction. Wobble jitter increases as a result of variations in phase, which in turn induces an increase in an address demodulation error. For instance, in a Blu-ray, a wobble signal is multiplied by a clock signal that is generated by supplying the wobble signal to a PLL circuit, thereby performing MSK demodulation and HMW demodulation. However, a PLL clock signal cannot follow a disturbance in the phase of the wobble signal, and hence the crosstalk becomes a great factor for the demodulation error.

FIG. 6 shows a mechanism of generation of crosstalk in a wobble signal. Under normal conditions, when a laser beam spot is on the track of a track N on the optical disk, the laser beam spot is also radiated on adjacent tracks N−1 and N+1 as well as on the track N. A reproduced signal is superimposed on wobble signals of these tracks N−1 and N+1 also. However, a relationship among the phases of the wobble signals of the tracks N, N−1, and N+1 varies at all times. Moreover, modulation, such as MSK or HMW, is also added to respective wobble signal components. Hence, a wobble signal of the track N having undergone crosstalk from the wobble signals of the tracks N+1 and N−1 exhibits unpredictable phase variations.

Wobble signals complying with the Blu-ray standards employ both the MSK scheme and the HMW scheme, and a heterodyne scheme is adopted as a demodulation scheme. The scheme is one for detecting a modulated portion by means of multiplying a wobble signal by a clock signal that is obtained by supplying the wobble signal to the PLL circuit. Since the PLL circuit operates in accordance with a mean wobble frequency and a mean phase from a time constant of a loop filter, the clock signal generated by the PLL circuit cannot follow jitter induced by variations in crosstalk component.

FIGS. 7A to 7D show heterodyne operation performed according to presence/absence of crosstalk. FIG. 7A shows heterodyne multiplication of a crosstalk-free MSK-modulated portion. The MSK-modulated portion can be detected by integration of multiplied signal waveforms. FIG. 7B shows heterodyne multiplication of the MSK-modulated portion performed when a phase shift has arisen, for reasons of crosstalk, between the wobble signal and the multiplying clock signal. When compared with the operation shown in FIG. 7A, an envelope having a multiplied waveform is wavy, and difficulty is encountered to detect the MSK-modulated portion accurately. FIG. 7C shows heterodyne multiplication of the crosstalk-free HMW-modulated portion. FIG. 7D shows heterodyne multiplication of the HMW-modulated portion performed when a phase shift has arisen, for reasons of crosstalk, between the wobble signal and the multiplication clock signal. It is seen from the drawings that a disturbance arises in the envelope having a multiplied waveform because of a phase shift induced by crosstalk, thereby posing difficulty in detection of the HMW-modulated portion as in the case of the MSK-modulated portion.

With a view toward solving the problem, preparing a plurality of clock signals of different phases for the purpose of selecting a clock signal of the best phase is disclosed in the related art. For instance, JP 2005-216394 A describes a demodulator intended for effecting stable demodulation by means of enabling performance of more accurate phase control without involvement of an increase in sampling frequency. Specifically, there is described a configuration where a circuit that performs demodulation by subjecting an input modulation signal wave to computation along with an internal reference wave has, as a table for the internal reference wave, a plurality of tables whose phases are changed; where, even when a phase difference exists between a clock signal used for generating an internal reference wave and an input modulation signal, the phase of the internal reference wave is controlled so as to cancel the phase difference by means of a configuration that enables selection of any one from the plurality of tables; and where computation for demodulation can be performed by means of the in-phase waveforms.

However, such a configuration for preparing a plurality of clock signals having different phases becomes complicate, and cost increases, as well.

SUMMARY

The present invention provides an apparatus that eliminates influence of crosstalk with a simple configuration and that enables highly-accurate demodulation of a wobble signal.

The present invention is directed toward a demodulation circuit for demodulating an MSK-modulated wobble signal comprising:

a zero-crossing point detection section that detects zero-crossing points of the wobble signal;

a sinusoidal wave generation section that generates a sinusoidal wave signal from the zero-crossing points by means of sequentially connecting sinusoidal wave elements, each of which is equal to one period corresponding to a time interval between the zero-crossing points;

a computing section that multiplies the wobble signal by the sinusoidal wave signal; and an MSK-modulated portion detection section that detects the MSK-modulated portion from a signal acquired through multiplication.

The present invention is also directed toward a demodulation circuit for demodulating an HMW-modulated wobble signal comprising:

a zero-crossing point detection section that detects zero-crossing points of the wobble signal;

a sinusoidal wave generation section that generates a sinusoidal wave signal from the zero-crossing points by means of sequentially connecting sinusoidal wave elements, each of which is equal to one period corresponding to a time interval between the zero-crossing points;

a computing section that multiplies the wobble signal by the sinusoidal wave signal; and an HMW-modulated portion detection section that detects the HMW-modulated portion from a signal acquired through multiplication.

The present invention is further directed toward a demodulation circuit for demodulating an MSK-modulated wobble signal and an HEW-modulated wobble signal, comprising:

a zero-crossing point detection section that detects zero-crossing points of the wobble signal;

a sinusoidal wave generation section that generates a sinusoidal wave signal from the zero-crossing points by means of sequentially connecting sinusoidal wave elements, each of which is equal to one period corresponding to a time interval between the zero-crossing points;

a computing section that multiplies the wobble signal by the sinusoidal wave signal;

an MSK-modulated portion detection section that detects the MSK-modulated portion from a signal acquired through multiplication; and an HMW-modulated portion detection section that detects the HMW-modulated portion from a signal acquired through multiplication.

According to the present invention, a wobble signal can be demodulated with high accuracy by eliminating the influence of crosstalk.

The invention will be more clearly comprehended by reference to the embodiment provided below. However, the following embodiment is merely illustrative, and the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the present invention will be described hereunder by reference to the drawings.

Figure 1:
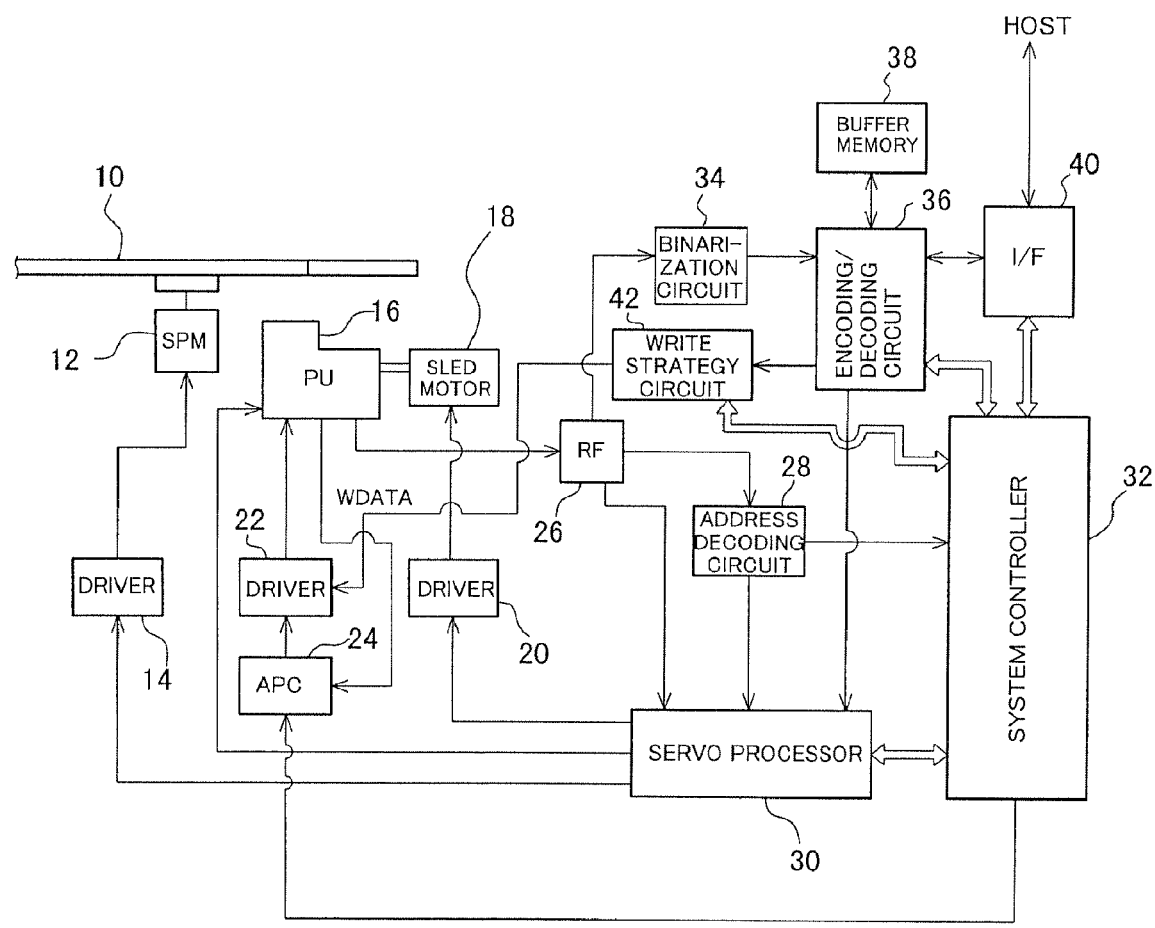
FIG. 1 is an overall block diagram of an optical disk drive of an embodiment of the present invention.

FIG. 1 shows the overall configuration of an optical disk drive of the embodiment. An optical disk 10, such as a CD, a DVD, an HD-DVD, and a Blu-ray, is driven by a spindle motor (SPM) 12. The spindle motor SPM 12 is driven by a driver 14, and the driver 14 is servo-controlled by a servo processor 30 so as to attain a desired rotational speed.

The optical pickup 16 includes a laser diode (LD) serving as a semiconductor laser element for radiating a laser beam onto the optical disk 10 and a photodetector (PD) that receives light reflected from the optical disk 10 and converts the thus-received light into an electric signal; and is disposed opposite the optical disk 10. The optical pickup 16 is driven in a radial direction of the optical disk 10 by means of a sled motor 18 made up of a stepping motor, and the sled motor 18 is driven by a driver 20. As is the case with the driver 14, the driver 20 is servo-controlled by the servo processor 30. A semiconductor laser element of the optical pickup 16 is driven by a driver 22, and the driver 22 is controlled by an automatic power control circuit (APC) 24 in such a way that a drive current comes to a desired value. The APC 24 and the driver 22 control amounts of light emitted by the semiconductor laser element under an instruction from a system controller 32. In FIG. 1, the driver 22 is provided separately from the optical pickup 16, but the driver 22 may also be incorporated into the optical pickup 16.

Recording and reproducing operation for the optical disk 10 are as follows. When data recorded in the optical disk 10 are reproduced, a laser beam of reproducing power is emitted from the semiconductor laser element of the optical pickup 16; resultant reflected light is converted into an electric signal by the PD; and the electric signal is output. A reproduced signal from the optical pickup 16 is fed to an RF circuit 26. The RF circuit 26 generates from the reproduced signal a focus error signal and a tracking error signal and feeds the thus-generated signals to the servo processor 30. In accordance with these error signals, the servo processor 30 servo-controls the optical pickup 16, thereby maintaining the optical pickup 16 in on-focus and on-track states. Moreover, the RF circuit 26 feeds an address signal included in the reproduced signal to the address decoding circuit 28. The address decoding circuit 28 demodulates address data pertaining to the optical disk 10 from the address signal and feeds the thus-demodulated address data to the servo processor 30 and the system controller 32. The RF circuit 26 also feeds a reproduced RF signal to a binarization circuit 34. The binarization circuit 34 binarizes the reproduced signal and feeds the thus-acquired signal to an encoding/decoding circuit 36. The encoding/decoding circuit 36 subjects the binarized signal to demodulation and error correction, to thus acquire reproduced data. The reproduced data are output to a host machine, such as a personal computer, by way of an interface I/F 40. When the reproduced data are output to the host machine, the encoding/decoding circuit 36 outputs the reproduced data after temporarily storing the data in buffer memory 38.

When data are recorded in the optical disk 10, data to be recorded transmitted from the host machine are fed to the encoding/decoding circuit 36 by way of the interface I/F 40. The encoding/decoding circuit 36 stores in the buffer memory 38 the data to be recorded; encodes the data to be recorded; and feeds the thus-encoded data as modulated data to a write strategy circuit 42. In accordance with a predetermined recording strategy, the write strategy circuit 42 converts the modulated data into a multipulse (a pulse train), and feeds the multipulse as a recording pulse to the driver 22. Since the recording strategy affects recording quality, optimization is performed prior to recording of data. The laser beam whose power is modulated by the recording pulse is emitted from the semiconductor laser element of the optical pickup 16, whereupon data are recorded in the optical disk 10. The recording power employed during data recording operation is optimized by means of writing test data, for a try, by use of a PCA (Power Calibration Area) that is formed along an inner radius of the optical disk 10 through OPC (Optimum Power Control). After recording of data, the optical pickup 16 radiates a laser beam of reproducing power, thereby reproducing record data; and feeds the record data to the RF circuit 26. The RF circuit 26 feeds are produced signal to the binarization circuit 34, and the thus-binarized data are fed to the encoding/decoding circuit 36. The encoding/decoding circuit 36 decodes the modulated data, and verifies the thus-decoded data against record data stored in the buffer memory 38. A result of verification is fed to the system controller 32. The system controller 32 determines whether to continually record data in accordance with the result of verification or to perform alternating operation. The system controller 32 controls operation of the entire system, to thus drive the sled motor 18 by way of the servo processor 30 and control the position of the optical pickup 16.

In such an overall configuration, the RF circuit 26 demodulates a wobble signal included in the reproduced RF signal. However, the wobble signal is multiplied by a sinusoidal wave computed from a zero-crossing point of the wobble signal rather than the wobble signal being multiplied by a clock signal obtained by feeding the wobble signal to the PLL circuit as in the related art, whereby the MSK-modulated portion and an HMW-modulated portion of the wobble signal are demodulated in accordance with a phase shift induced by crosstalk. Although MSK modulation and HMW modulation are known, a portion of the fundamental frequency signal (a reference carrier signal) of the wobble signal is replace with a signal having a 1.5-fold frequency according to an MSK (Minimum Shift Keying) modulation scheme, and addressing is performed by detection of the frequency-modulated portion. Under the HMW (Harmonic Wave) modulation scheme, a signal whose frequency is double a reference carrier signal is superimposed on a portion of the reference carrier signal, thereby causing a wobble signal to address the shape of a sawtooth. Addressing is performed by detection of the phase of the superimposed signal. The MSK-modulated portion and the HMW-modulated portion are located at different positions in respective blocks, and a reference carrier signal having a one period or more is provided in the MSK-modulated portion and the HMW-modulated portion. The MSK modulation scheme has the property of being comparatively susceptible to flaws or crosstalk, and the HMW modulation scheme has the property of being sensitive to a tilt. The reliability of addressing is enhanced by complementarily using both modulation schemes in combination.

Figure 2:
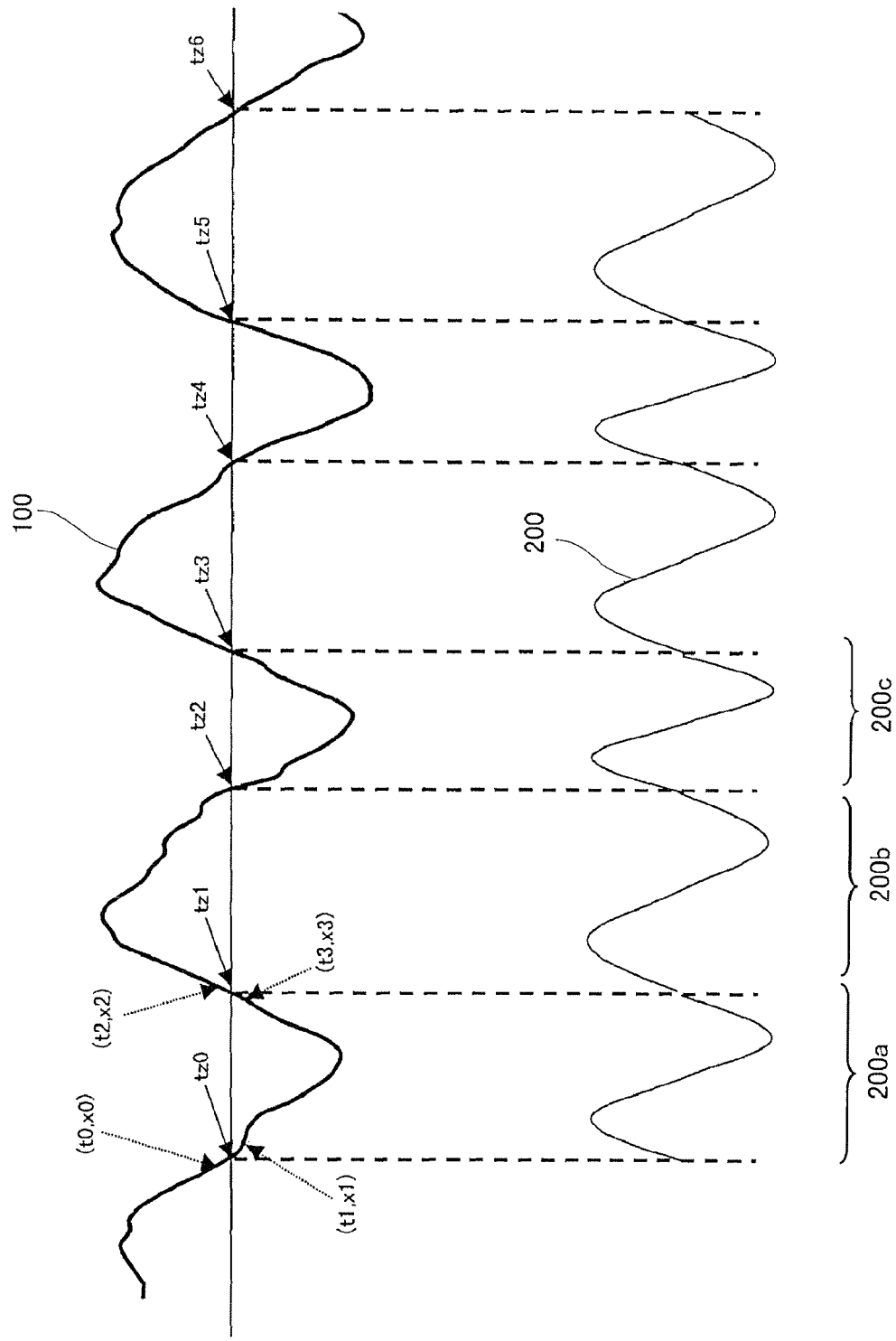
FIG. 2 is a descriptive view of the principle in the embodiment; namely, a descriptive view of sinusoidal wave elements and a sinusoidal wave signal formed by connection of the elements.

FIG. 2 shows the principle of demodulation of a wobble signal according to the present embodiment. A DC component and high frequency noise are eliminated from a reproduced wobble signal 100 by means of an appropriate HPF (high-pass filter) and an appropriate LPF (low-pass filter). Subsequently, the wobble signal is subjected to A-D conversion.

Next, the wobble signal 100 computes a zero-crossing time from times that are immediately before and after zero-crossing of the wobble signal 100 and an A-D value; namely, (t0, x0) to (t3, x3) shown in FIG. 2. At this time, a period between (t0, x0) and (t1, x1) and a period between (t2, x2) and (t3, x3) are subjected to; for example, linear interpolation. Thus, zero-crossing times tz0, tz1, tz2, tz3, tz4, tz5, and tz6 of the wobble signal 100 can be obtained.

A time T01 located between tz0 and tz1, a time T12 located between tz1 and tz2, a time T23 located between tz2 and tz3, ..., are subsequently computed. A period T01 equivalent to one period of a sinusoidal wave of a predetermined amplitude (a sinusoidal wave element 200a) is prepared by means of taking the time tz0 as 0°; a period T12 equivalent to one period of a sinusoidal wave of a predetermined amplitude (a sinusoidal wave element 200b) is prepared by means of taking the time tz1 as 0°; a period T23 equivalent to one period of a sinusoidal wave of a predetermined amplitude (a sinusoidal wave element 200c) is prepared by means of taking the time tz2 as 020 ; and the like. One sinusoidal wave signal 200 is prepared by sequentially connecting these sinusoidal wave elements 200a, 200b, 200c, .... The sinusoidal wave signal 200 prepared by interconnecting the sinusoidal wave elements 200a, 200b, 200c, ..., is multiplied by a wobble signal, thereby performing heterodyne computation.

Figure 3:
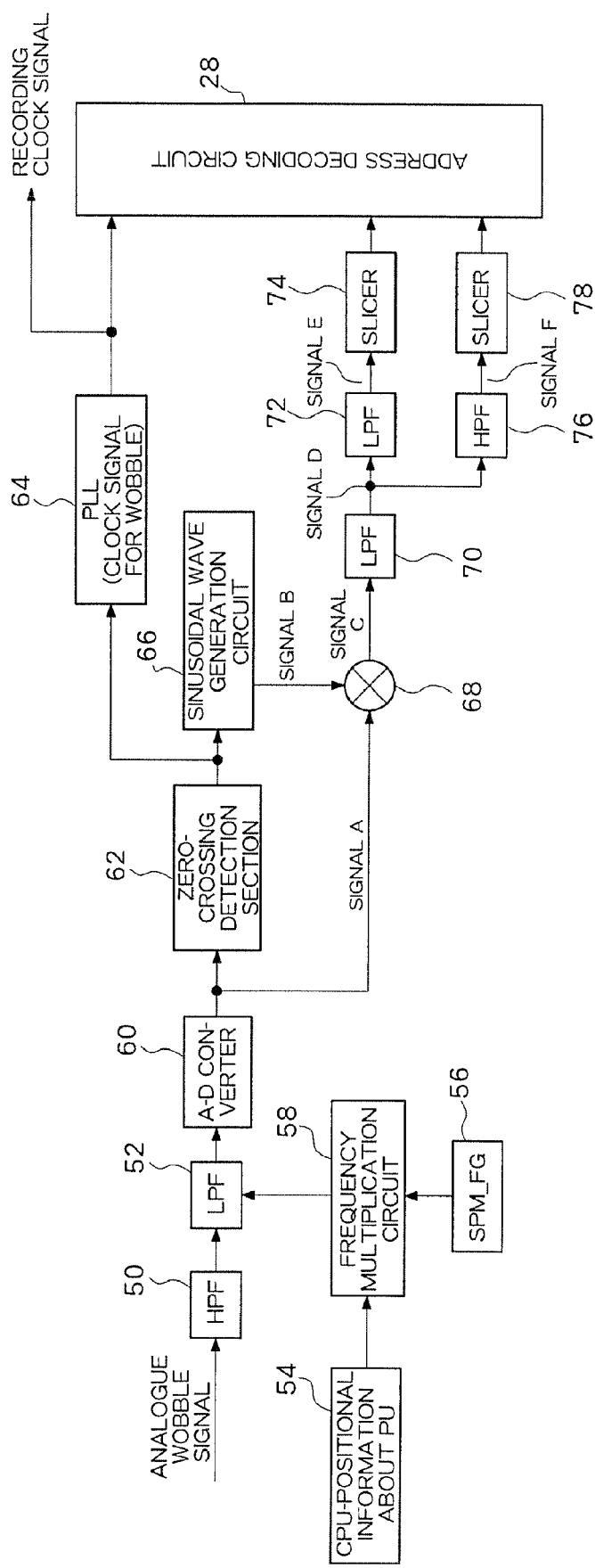
FIG. 3 is a block diagram of a wobble signal demodulation circuit of the embodiment.

FIG. 3 shows the configuration of a wobble signal demodulation circuit of the present embodiment. The wobble signal demodulation circuit may also be provided in the RF circuit 26 or separately from the RF circuit 26.

An analogue wobble signal is input to an HPF (high-pass filter) 50, and the analogue wobble signal is output to an LPF (low-pass filter) 52 after a DC component has been removed from the analogue wobble signal. The HPF 50 has; for example, a band which is about one-hundredths of a wobble frequency.

The LPF (low-pass filter) 52 eliminates high-frequency noise from the analogue wobble signal and outputs the analogue wobble signal to an A-D converter 60. Removal of high-frequency noise is for accurately detecting a zero-crossing point of the wobble signal. The LPF 52 has; for example, a band that is about three times a wobble frequency.

The A-D converter 60 subjects a wobble signal to A-D conversion and outputs the wobble signal to a zero-crossing detector 62 and a multiplier 68. In order to accurately detect a zero-crossing point, a higher sampling rate for A-D conversion is preferable. Preferably, the sampling rate is at least ten times as large as the wobble frequency.

As shown in FIG. 2, the zero-crossing detector 62 detects zero-crossing times tz0, tz1, tz2, tz3, tz4, tz5, tz6, ..., of the wobble signal by means of linear interpolation and outputs the thus-detected times to a sinusoidal wave generation circuit 66 and to the PLL circuit 64, as well.

The PLL circuit 64 generates a clock signal by use of the zero-crossing signal and takes the thus-generated clock signal as a recording clock signal, and outputs the clock signal as a demodulation clock signal to an address decoding circuit 28.

As mentioned above, a sinusoidal wave generation circuit 66 computes a time T01 located between tz0 and tz1, a time T12 located between tz1 and tz2, a time T23 located between tz2 and tz3,. One sinusoidal wave of a period T01 is prepared by means of taking time tz0 as 0°. One sinusoidal wave of a period T12 is prepared by means of taking time tz1 as 0°. One sinusoidal wave of a period T23 is prepared by means of taking time tz2 as 0°. A sinusoidal wave is prepared by sequential generation of these sinusoidal waves. The sinusoidal wave generation circuit 66 outputs the thus-generated sinusoidal wave to a multiplier 68.

The multiplier 68 multiplies a wobble signal from the A-D converter 60 by a sinusoidal wave from the sinusoidal wave generation circuit 66 (heterodyne multiplication), and outputs a result of multiplication to an LPF 70.

The LPF 70 is an FIR filter; eliminates high-frequency noise from the result of multiplication; and outputs the result to the LPF 72 and the HPF 76. A band of the LPF 70 is one-half a wobble frequency. As is the case with the LPF 70, the LPF 72 is an FIR filter; eliminates a high-frequency component from a wobble frequency; and outputs the component to a slicer 74. The band of the LPF 72 is a one-quarters of the wobble frequency. The HPF 76 eliminates low-frequency noise, and outputs the component to a slicer 78. As is the case with the LPF 72, the band of the HPF 76 is one-quarters of the wobble frequency.

The slicer 74 determines from a signal representing a result of multiplication whether HMW assumes 0 or 1, by use of predetermined slice levels E1 and E2 and outputs a result of determination to the address decoding circuit 28.

The slicer 78 determines, from a signal representing the result of multiplication, whether a monotone portion or an MSK-modulated portion is achieved, by use of the predetermined slice levels F1 and F2; and outputs a result of determination to the address decoding circuit 28.

The address decoding circuit 28 demodulates an address from a result of determination of the input HMW0, the HMW1, the monotone portion, and the MSK-modulated portion.

Figure 4:
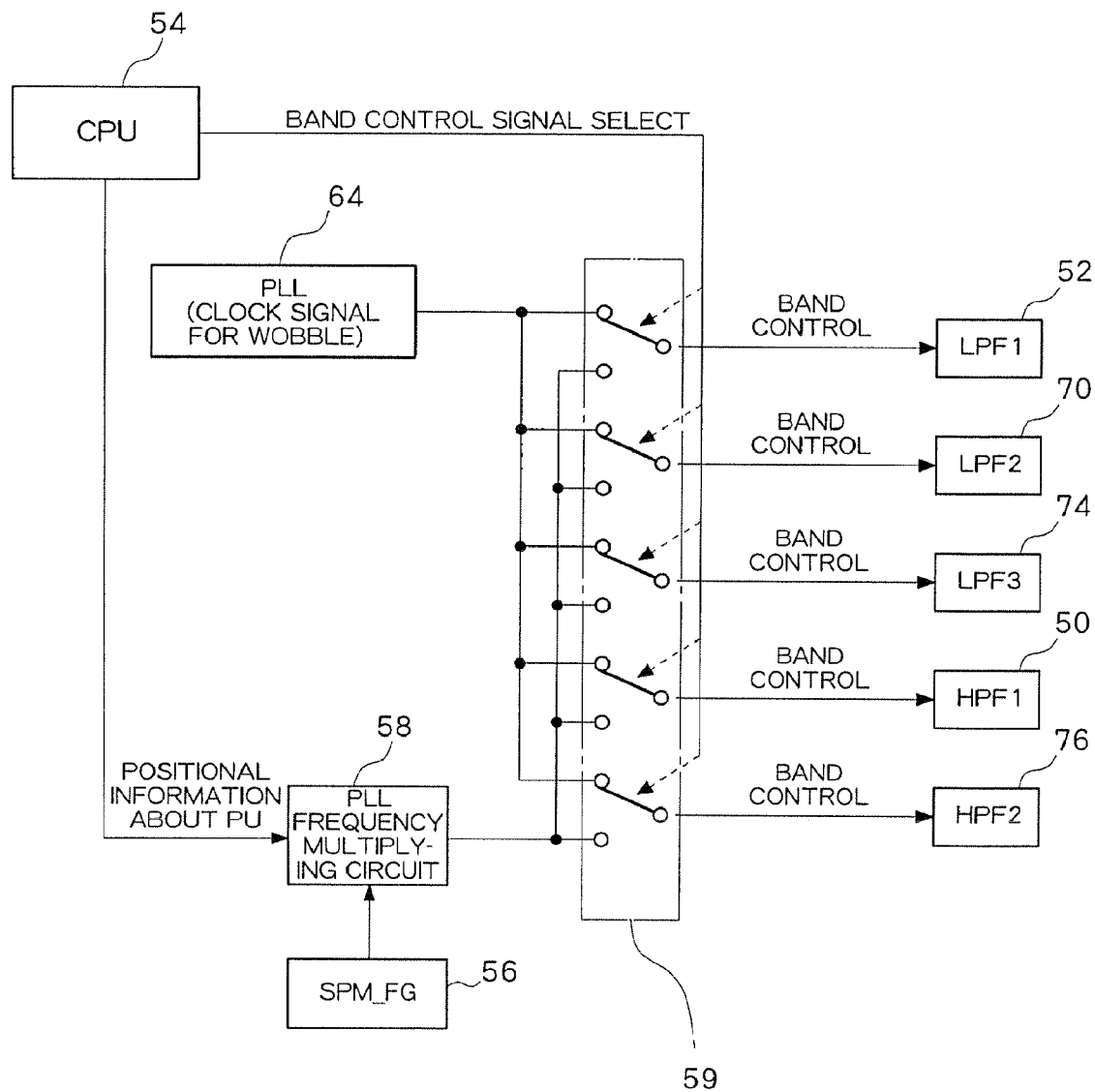
FIG. 4 is a block diagram of a filter band control circuit of the embodiment.

FIG. 4 shows the configuration of a control circuit that controls a band of the LPF and a band of the HPF. The band control circuit is a portion of the wobble signal demodulation circuit shown in FIG. 3. When the band of the filter of a wobble signal reproduction system is a fixed value or corresponds to a CAV (a constant angular velocity), the filters are controlled, as a filter whose band can be varied by an input clock from a switched capacitor, by a clock signal generated as a result of the wobble signal being supplied to the PLL. However, in the present embodiment, when the influence of a filter is relatively large; when the spindle motor SPM is in the middle of acceleration or deceleration as in seeking operation, or the like; and when the number of rotations of the spindle motor SPM has not yet reached a target number of rotations, a filter band does not always become optimum for a reproduced wobble signal and may hinder demodulation of an address. Accordingly, in the present embodiment, the bands of the respective filters are limited by use of an FG pulse (an output signal) from the spindle motor SPM, as shown in FIG. 4.

Specifically, a PLL frequency multiplying circuit 58 multiplies an FG pulse from an FG generator 56 of the spindle motor SPM in accordance with positional information about the optical pickup (PU) from the CPU 54 (or the system controller 32), and outputs a result of multiplication of the pulse to one terminal of a switch 59. A clock signal generated by the PLL 64 is fed to the other input terminal of the switch 59. The CPU 54 feeds either the clock signal or a signal generated as a result of multiplication of the FG pulse, as a band limit signal, to each of the filters 52, 70, 74, 50, and 76 by means of switching the switch 59. Specifically, when the spindle motor SPM is in the middle of acceleration or deceleration as in seeking operation and when the number of rotations of the spindle motor SPM has not yet reached a target number of rotations, a signal obtained by multiplying the FG pulse according to the position of the optical pickup (PU) is fed as a band limit signal. In other cases, a clock signal is fed as a band limit signal. As a matter of course, even after the number of rotations of the spindle motor SPM has reached a target number of rotations, a signal obtained by multiplication of the FG pulse may also be fed as a band limit signal. Since the position of the optical pickup varies at all times, it is troublesome for the CPU 54 to control the position of the optical pickup. Therefore, it is preferable to impose a band limit by switching the band limit signal to the clock signal generated as a result of a wobble signal being fed to the PLL.

Figure 5:
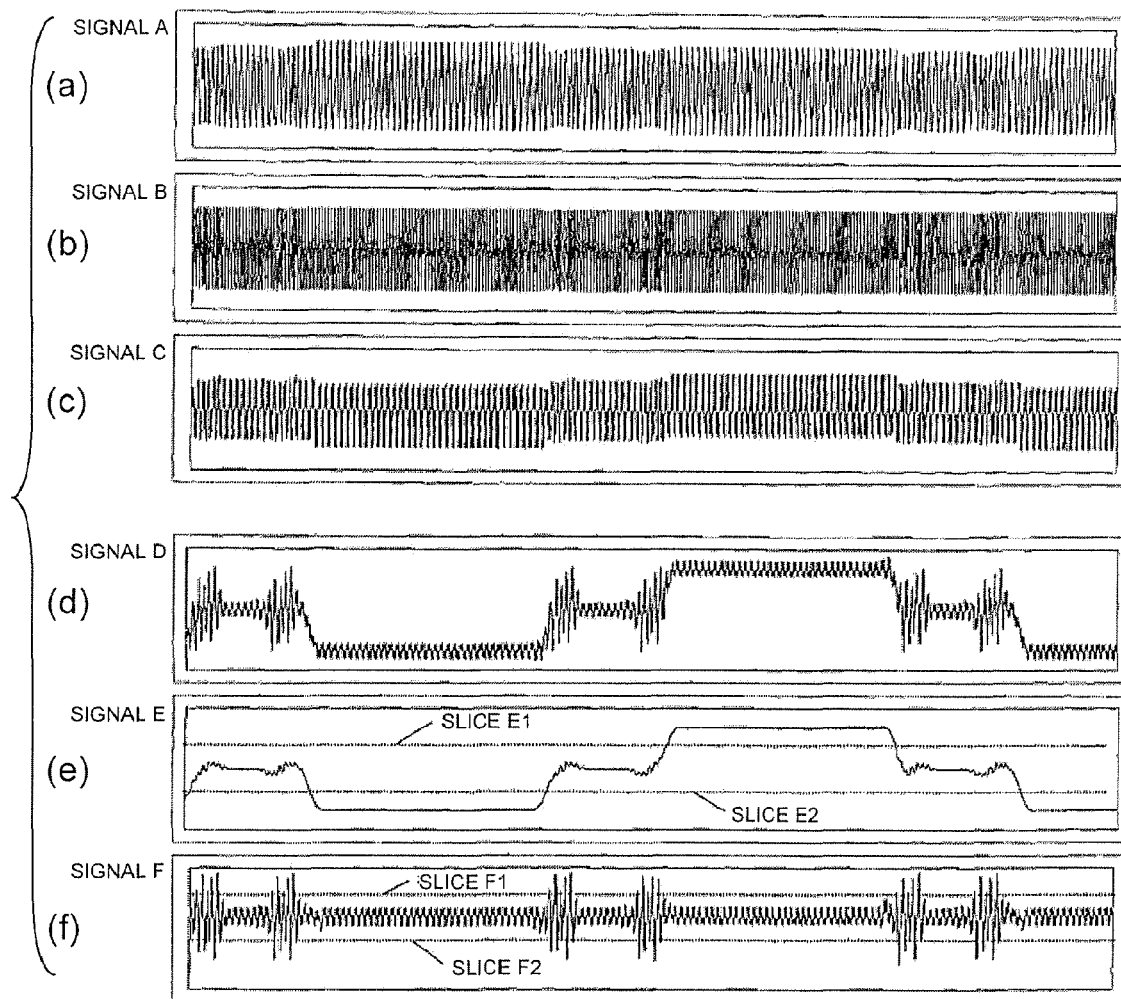
FIG. 5 is a descriptive view of signal waveforms of respective sections shown in FIG. 3.
Figure 6:
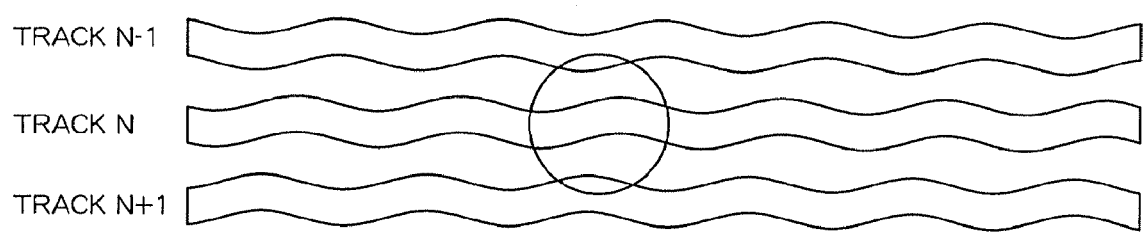
FIG. 6 is a descriptive view of occurrence of crosstalk.
Figure 7A:
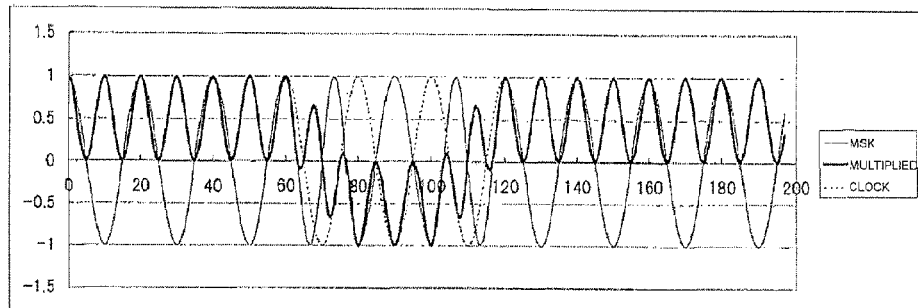
FIGS. 7A, 7B, 7C, and 7D are timing charts showing a method for detecting an MSK-modulated portion and an HMW-modulated portion in the related art.
Figure 7B:
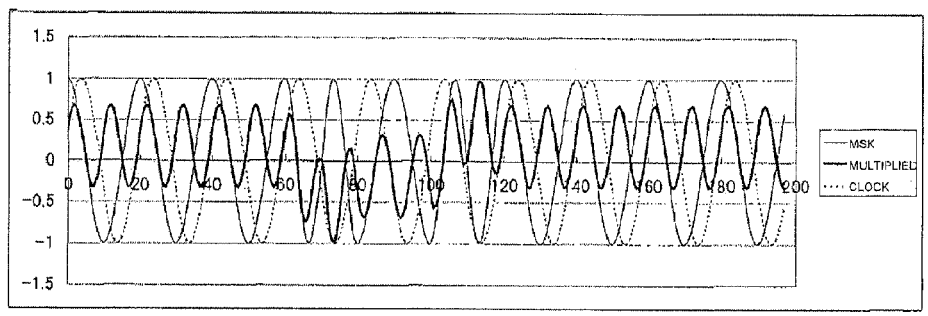
Figure 7C:
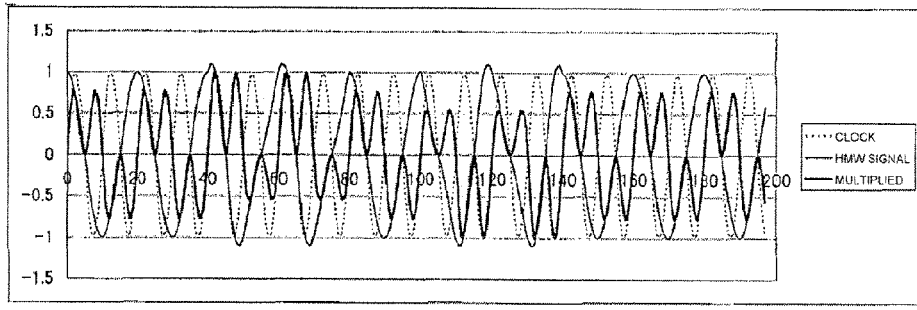
Figure 7D:
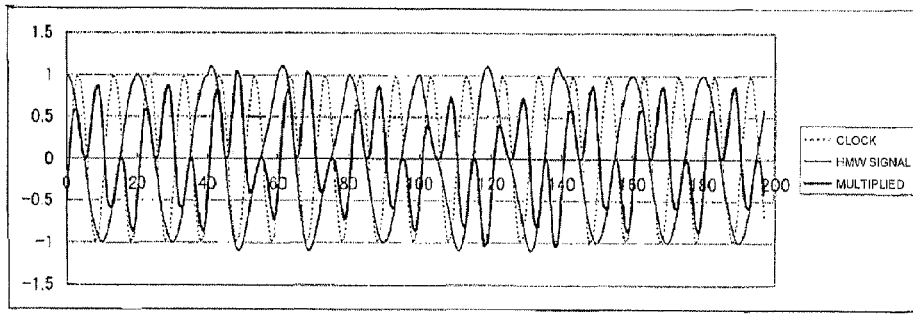

FIG. 5 shows signal waveforms achieved in the respective sections shown in FIG. 3. FIG. 5A shows a signal A from the A-D converter 60; namely, the waveform of a wobble signal. FIG. 5B shows a sinusoidal wave B output from the sinusoidal wave generation circuit 66. In the present embodiment, the time T01 located between tz0 and tz1, the time T12 located between tz1 and tz2, the time T23 located between tz2 and tz3, . . . , are computed. One sinusoidal wave having a period of T01 is prepared by means of taking the time tz0 as 0°; one sinusoidal wave having a period T12 is computed by means of taking the time tz1 as 0°; and one sinusoidal wave having a period T23 is sequentially prepared by means of taking the time tz2 as 0°. A sinusoidal wave is prepared through sequential preparation of the sinusoidal waves, and hence the sinusoidal wave has a frequency which is double the frequency of the wobble signal. Consequently, the MSK-modulated portion has a frequency that is 1.5 times as large as the frequency of the monotone portion. FIG. 5C shows a result of multiplication of the signal A by the signal B; namely, a signal C from the multiplier 68. FIG. 5D shows a signal D from the LPF 70, in which the frequency of the MSK-modulated portion is enhanced under the influence of aliasing. FIG. 5E shows a signal E from the LPF 72, and the slicer 74 compares the signal E with the slice levels E1 and E2, and a relationship of E1>E2 stands. When the input signal is larger than the slice level E1, HMW is determined to assume a value of one. When the input signal is smaller than the slice level E2, HMW is determined to assume a value of zero. FIG. 5F shows a signal F from the HPF 76. The slicer 78 compares the signal F with the slice levels F1 and F2. A relationship of F1>F2 stands. When the input signal is larger than the slice level F1 or when the input signal is smaller than the slice level F2, the MSK-modulated portion is determined to be attained. Portions other than the MSK-modulated portion are determined to be monotone portions.

As mentioned above, in the present embodiment, the zero-crossing point of the wobble signal is detected, and a sinusoidal wave is generated from intervals between zero-crossing points, thereby performing heterodyne multiplication. Thus, the influence of a phase shift in wobble signal induced by crosstalk can be eliminated.

In the present embodiment, the slicer 74 determines HMW to be zero or one, and a distinction between the MSK-modulated portion and the monotone portion is performed by the slicer 78. However, the slicer 74 may determine HMW to be zero or one, and the MSK-modulated portion may also be determined by means of a related-art configuration. Alternatively, the slicer 78 performs a distinction between the MSK-modulated portion and the monotone portion, and HMW may also be determined by means of the related-art configuration. Influence of crosstalk is considered to noticeably appear particularly in the MSK-modulated portion, and therefore a distinction between the MSK-modulated portion and the monotone portion is preferably made by means of at least the slicer 78 of the present embodiment.

What is claimed is:
1. A demodulation circuit for demodulating an MSK-modulated wobble signal comprising:
　a zero-crossing point detection section that detects zero-crossing points of the wobble signal;
　a sinusoidal wave generation section that generates a sinusoidal wave signal from the zero-crossing points by means of sequentially connecting sinusoidal wave ele- ments, each of which is equal to one period corresponding to a time interval between the zero-crossing points;
a computing section that multiplies the wobble signal by the sinusoidal wave signal; and
an MSK-modulated portion detection section that detects the MSK-modulated portion from a signal acquired through multiplication.

2. A demodulation circuit for demodulating an HMW-modulated wobble signal comprising:
a zero-crossing point detection section that detects zero-crossing points of the wobble signal;
a sinusoidal wave generation section that generates a sinusoidal wave signal from the zero-crossing points by means of sequentially connecting sinusoidal wave elements, each of which is equal to one period corresponding to a time interval between the zero-crossing points;
a computing section that multiplies the wobble signal by the sinusoidal wave signal; and
an HMW-modulated portion detection section that detects the HMW-modulated portion from a signal acquired through multiplication.

3. A demodulation circuit for demodulating an MSK-modulated wobble signal and an HMW-modulated wobble signal, comprising:
a zero-crossing point detection section that detects zero-crossing points of the wobble signal;
a sinusoidal wave generation section that generates a sinusoidal wave signal from the zero-crossing points by means of sequentially connecting sinusoidal wave elements, each of which is equal to one period corresponding to a time interval between the zero-crossing points;
a computing section that multiplies the wobble signal by the sinusoidal wave signal;
an MSK-modulated portion detection section that detects the MSK-modulated portion from a signal acquired through multiplication; and
an HMW-modulated portion detection section that detects the HMW-modulated portion from a signal acquired through multiplication.

4. The demodulation circuit according to claim 3, wherein the MSK-modulated portion detection section includes:
a high-pass filter section that eliminates a low-frequency component of the signal acquired through multiplication; and
a comparison section that compares a signal output from the high-pass filter section with a high-pass filter level, thereby detecting the MSK-modulated portion.

5. The demodulation circuit according to claim 3, further comprising:
a first low-pass filter section that eliminates a high-frequency component of the wobble signal and supplies the wobble signal to the zero-crossing point detection section;
the HMW-modulated portion detection section includes:
a second low-pass filter section that eliminates a high-frequency component of the signal acquired through multiplication, and
a first comparison section that compares a signal output from the second low-pass filter section with a low-pass filter level, thereby detecting the HMW-modulated portion;
the MSK-modulated portion detection section includes:
a high-pass filter section that eliminates a low-frequency component of the signal acquired through multiplication, and
a second comparison section that compares a signal output from the high-pass filter section with a high-pass filter level, thereby detecting the MSK-modulated portion; and
the demodulation circuit further includes:
a band frequency control section that changes band frequencies of the first low-pass filter section, the second low-pass filter section, and the high-pass filter section in accordance with the rotational speed of the optical disk.

6. An optical disk drive having a demodulation circuit for demodulating an MSK-modulated wobble signal and an HMW-modulated wobble signal, comprising:
a zero-crossing point detection section that detects zero-crossing points of the wobble signal;
a sinusoidal wave generation section that generates a sinusoidal wave signal from the zero-crossing points by means of sequentially connecting sinusoidal wave elements, each of which is equal to one period corresponding to a time interval between the zero-crossing points;
a computing section that multiplies the wobble signal by the sinusoidal wave signal;
an MSK-modulated portion detection section that detects the MSK-modulated portion from a signal acquired through multiplication; and
an HMW-modulated portion detection section that detects the HMW-modulated portion from a signal acquired through multiplication.

7. The optical disk drive according to claim 6, wherein the HMW-modulated portion detection section includes:
a low-pass filter section that eliminates a high-frequency component of the signal acquired through multiplication; and
a first comparison section that compares a signal output from the low-pass filter section with a low-pass filter level, thereby detecting the HMW-modulated portion; and wherein the MSK-modulated portion detection section includes:
a high-pass filter section that eliminates a low-frequency component of the signal acquired through multiplication; and
a second comparison section that compares a signal output from the high-pass filter section with a high-pass filter level, thereby detecting the MSK-modulated portion.

8. The optical disk drive according to claim 6, further comprising:
a first low-pass filter section that eliminates a high-frequency component of the wobble signal and supplies the wobble signal to the zero-crossing point detection section; the HMW-modulated portion detection section includes
a second low-pass filter section that eliminates a high-frequency component of the signal acquired through multiplication, and
a first comparison section that compares a signal output from the second low-pass filter section with a low-pass filter level, thereby detecting the HMW-modulated portion;
the MSK-modulated portion detection section includes
a high-pass filter section that eliminates a low-frequency component of the signal acquired through multiplication, and
a second comparison section that compares a signal output from the high-pass filter section with a high-pass filter level, thereby detecting the MSK-modulated portion; and the optical disk drive further includes:

a band frequency control section that changes band frequencies of the first low-pass filter section, the second low-pass filter section, and the high-pass filter section in accordance with the rotational speed of the optical disk.

9. The demodulation circuit according to claim 3, wherein the HMW-modulated portion detection section includes:

a low-pass filter section that eliminates a high-frequency component of the signal acquired through multiplication; and a comparison section that compares a signal output from the low-pass filter section with a low-pass filter level, thereby detecting the HMW-modulated portion.

* * * * *